United States Patent
Juhasz et al.

(10) Patent No.: US 9,372,280 B2
(45) Date of Patent: Jun. 21, 2016

(54) SYSTEM AND METHOD FOR IN-SEA ELECTRODE CONDITIONING

(75) Inventors: Andras Robert Juhasz, Stockholm (SE); Ulf Peter Lindqvist, Segeltorp (SE)

(73) Assignee: PGS Geophysical AS, Oslo (NO)

( * ) Notice: Subject to any disclaimer, the term of this patent is extended or adjusted under 35 U.S.C. 154(b) by 766 days.

(21) Appl. No.: 13/358,255

(22) Filed: Jan. 25, 2012

(65) Prior Publication Data

US 2013/0187655 A1 Jul. 25, 2013

(51) Int. Cl.
*G01V 3/08* (2006.01)
*G01V 3/00* (2006.01)
*G01V 13/00* (2006.01)

(52) U.S. Cl.
CPC ............. *G01V 13/00* (2013.01); *G01V 3/083* (2013.01); *G01V 2003/084* (2013.01); *G01V 2003/085* (2013.01)

(58) Field of Classification Search
CPC ....................................................... G01V 3/08
USPC ......................................................... 324/365
See application file for complete search history.

(56) References Cited

U.S. PATENT DOCUMENTS

| | | | |
|---|---|---|---|
| 4,612,094 A | 9/1986 | Davenport et al. | |
| 4,617,518 A * | 10/1986 | Srnka ............................ | 324/365 |
| 4,847,980 A | 7/1989 | Witkowski et al. | |
| 5,160,590 A | 11/1992 | Totsuka et al. | |
| 5,833,825 A | 11/1998 | Otten et al. | |
| 6,434,410 B1 | 8/2002 | Cordero et al. | |
| 6,674,286 B2 | 1/2004 | Lagmanson | |
| 7,446,535 B1 | 11/2008 | Tenghamn et al. | |
| 7,466,627 B2 | 12/2008 | Karlsen | |
| 7,671,598 B2 | 3/2010 | Ronaess et al. | |
| 7,733,740 B2 | 6/2010 | Hillesund et al. | |
| 7,803,258 B2 | 9/2010 | Sigrist | |
| 7,834,632 B2 | 11/2010 | Tenghamn et al. | |
| 8,131,522 B2 * | 3/2012 | Ziolkowski et al. ............. | 703/2 |
| 2007/0294036 A1 * | 12/2007 | Strack et al. .................... | 702/14 |
| 2008/0309346 A1 | 12/2008 | MacGregor et al. | |
| 2009/0001985 A1 * | 1/2009 | Besson et al. .................. | 324/334 |
| 2009/0140741 A1 * | 6/2009 | Tenghamn et al. ........... | 324/347 |

(Continued)

FOREIGN PATENT DOCUMENTS

| | | |
|---|---|---|
| WO | 99/65389 | 12/1999 |
| WO | 2012057606 | 5/2012 |
| WO | WO2012/106483 | 8/2012 |

OTHER PUBLICATIONS

M.L. Burrows, "Motion-Induced Noise in Towed Flexible Sensors", Mar. 24, 1969, Project Report for NAC-15 (Navy Communications), MIT Lincoln Laboratory,19 pages.*

"Silver chloride electrode", from Wikipedia encyclopedia website: http://en.wikipedia.org/wiki/Silver_chloride_electrode, pp. 1-4, dated Aug. 9, 2011.

(Continued)

*Primary Examiner* — Bot Ledynh

(57) ABSTRACT

Disclosed are methods and systems for conditioning electrodes while deployed in the sea with a marine electromagnetic survey system. An embodiment of the method may comprise deploying electrodes in seawater during a marine electromagnetic survey. The method further may comprise coupling at least one of the electrodes to a controllable current/voltage source while the electrodes are deployed in the seawater. The method further may comprise sending a first conditioning signal from the controllable current/voltage source to the at least one of the electrodes coupled to the controllable current/voltage source.

22 Claims, 3 Drawing Sheets

(56) References Cited

U.S. PATENT DOCUMENTS

2009/0294284 A1  12/2009  Hsiung et al.
2010/0001733 A1   1/2010  Combee
2010/0225324 A1*  9/2010  Strack et al. .................. 324/365
2011/0012601 A1*  1/2011  Hobbs et al. .................. 324/337
2011/0084696 A1*  4/2011  Tenghamn et al. ........... 324/337
2011/0292759 A1  12/2011  Sudow et al.
2012/0161774 A1*  6/2012  Strack et al. .................. 324/332

OTHER PUBLICATIONS

Exploration & Production Magazine article for the 2014 Meritorious Awards for Engineering Innovation available from http://www.epmag.com/item/print/2014-Meritorious-Awards-Engineering-Innovation__132699 and http://www.epmag.com dated May 1, 2014.
United Kingdom Search Report, May 9, 2013.

* cited by examiner

SYSTEM AND METHOD FOR IN-SEA ELECTRODE CONDITIONING

BACKGROUND

The present invention relates generally to the field of marine electromagnetic surveying. More particularly, in one or more embodiments, this invention relates to methods and systems for conditioning electrodes while deployed in the sea, for example, with a marine electromagnetic survey system.

One technique for marine electromagnetic surveying involves towing an energy source at a selected depth in a body of water. One or more survey cables also may be towed in the water at selected depths. The survey cables are essentially long cables having electromagnetic sensors disposed thereon at spaced apart locations. The energy source and survey cables may be positioned in the water by attached equipment, such as deflectors and position control devices. Actuation of the energy source emits an energy field into the body of water. The energy field interacts with the rock formations below the water bottom. The change in the energy field due to the interaction with the subterranean rock formation is detected by the electromagnetic sensors and used to infer certain properties of the subsurface rock, such as structure, mineral composition and fluid content, thereby providing information useful in the recovery of hydrocarbons. In addition to towed survey cables, electromagnetic survey systems may also use sensors that are at a fixed location with respect to the energy source, which may include attachment of electromagnetic sensors on one or more cables positioned on the water bottom or attachment of the electromagnetic sensors to one or subsurface acquisition nodes, for example.

Electrodes may be used in one or more of the components that are used in electromagnetic survey systems. For example, electromagnetic sources and electromagnetic sensors may each include a pair of electrodes. When deployed for an electromagnetic survey, these electrodes can be exposed to seawater, which may undesirably interact with the surface of the electrodes. For example, because a potential difference is typically applied across the electrodes during use, the surface of the electrodes can react with the seawater causing undesirable deposits that can degrade electrode performance. In addition, electrode performance can also be degraded by algae and other biological contaminations or growths that may occur on the surface of the electrodes. In some instances, the degradation of electrode performance caused by these undesirable interactions can limit the operational life of the electrodes used in the marine electromagnetic survey systems, as the interactions may result in decreased accuracy of measurements from sensor electrodes, for example. The current technique for restoring performance to the electrodes when these undesirable interactions have undesirably degraded their performance is to retrieve the electrodes and install replacement electrodes above the surface of the water. Drawbacks to this technique for restoring performance include the undesirable impact on the operational efficiency and safety of the survey systems caused by the time, effort, and expense associated with retrieval and replacement of the electrodes.

Accordingly, there is a need for improved methods and systems for restoration of electrode performance in marine electromagnetic survey systems.

BRIEF DESCRIPTION OF THE DRAWINGS

These drawings illustrate certain aspects of some of the embodiments of the present invention and should not be used to limit or define the invention.

DETAILED DESCRIPTION

The present invention relates generally to the field of marine electromagnetic surveying. More particularly, in one or more embodiments, this invention relates to methods and systems for conditioning electrodes while deployed in the sea with a marine electromagnetic survey system.

One of the many potential advantages of the systems and methods of the present invention, only some of which are disclosed herein, is that electrodes may be conditioned while in the sea, thus restoring electrode performance without requiring out-of-water retrieval and replacement of the electrodes. For example, embodiments of the present invention may be used to condition silver/silver chloride (Ag/AgCl) based electrodes, which are commonly used in electromagnetic survey systems. Because seawater contains large amounts of chloride ions, interactions between the surface of the Ag/AgCl-based electrodes and the seawater can be controlled to restore electrode performance. For example, embodiments of the present invention may cause formation of one or more fresh AgCl layers on the surface of the electrode by an electrochemical reaction of the Ag from the electrode with chloride ions in the seawater. By way of further example, embodiments of the present invention may cause removal of an exposed AgCl layer from the surface of the electrode, thus revealing a fresh AgCl layer while removing undesirable deposits or other contaminants (e.g., algae and other biological contaminants) that may have built up on the exposed AgCl layer. Because the electrodes are conditioned while in the sea, operational efficiency and safety of the marine electromagnetic survey system may benefit, as the time, effort, and expense associated with electrode replacement can be reduced, or potentially even eliminated.

Yet another potential advantage of the systems and methods of the present invention is that electrodes may be conditioned while deployed in the sea to create a desired layer on the surface of the electrodes. For example, embodiments of the present invention may be used to create Ag/AgCl-based electrodes. In some embodiments, interactions between the surface of an Ag-based electrode and the seawater can be controlled to form one or more AgCl layers on the surface of the electrode. Because the electrodes are created in the sea, the complexity associated with forming Ag/AgCl-based electrodes can be reduced.

Figure 1:
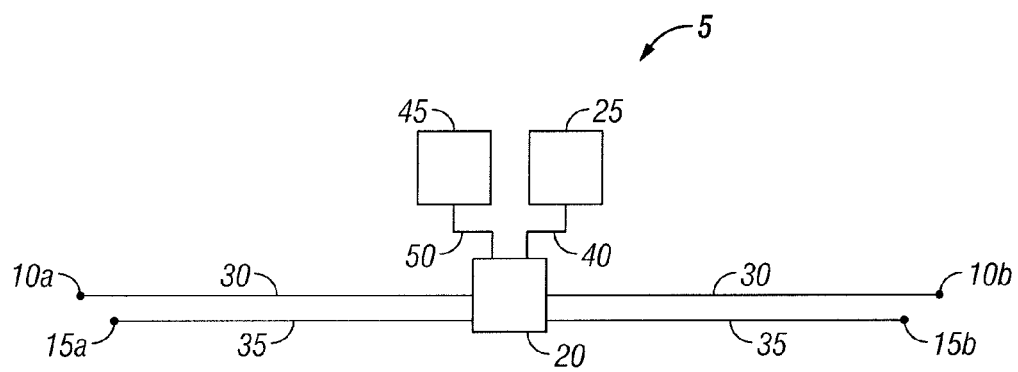
FIG. 1 is a schematic view of an electrode conditioning system in accordance with embodiments of the present invention.

FIG. 1 illustrates an electrode conditioning system 5 in accordance with embodiments of the present invention. In the illustrated embodiment, the electrode conditioning system 5 includes electrodes 10a and 10b, counter electrodes 15a and 15b, switch 20, and a controllable current/voltage source 25. As illustrated, the electrodes 10a and 10b may be coupled to the switch 20 by lines 30 while the counter electrodes 15a and 15b may be coupled to the switch 20 by lines 35, and the controllable current/voltage source 25 may be coupled to the switch 20 by line 40. The switch 20 may also be coupled to electronics 45 by line 50. The electronics 45 may include, for example, an amplifier, telemetry system, and/or other suitable electronics for operation of the electrodes 10a and 10b.

The electrodes 10a and 10b may be any electrode suitable for use in marine electromagnetic survey systems in accordance with embodiments of the present invention. Examples of suitable electrodes include source electrodes and sensor electrodes, such as those used in seismic and electromagnetic survey systems. In one embodiment, the electrodes 10a and 10b are Ag/AgCl-based electrodes, such as those used for sensor electrodes in electromagnetic survey systems. Those of ordinary skill in the art will appreciate that Ag/AgCl-based electrodes may be fabricated, for example, from sintering of AgCl onto an Ag rod or by chemically or electrochemically treating an Ag surface, for example. In the case of electrochemically treating the surface, the AgCl surface of the electrode may be created by an electrochemical reaction of Ag from the electrode metal with chloride ions in an electrolyte. While a special solution is typically formulated that contains the chloride ions for the electrochemical treatment, the electrodes 10a and 10b used in a marine electromagnetic survey system typically may be deployed in seawater, which contains a large amount of chloride ions in accordance with embodiments of the present invention. As will be discussed in more detail below, the electrode conditioning system 5 may be used, for example, to facilitate interactions between the electrodes and the seawater to either form fresh AgCl on, or remove AgCl from, the electrodes 10a and 10b. For example, a fresh layer of AgCl may be formed on an AgCl electrode to yield an Ag/AgCl-based electrode. Alternatively, the AgCl may be formed/removed to recondition an Ag/AgCl-based electrode. While the preceding description describes the use of Ag as the conducting material in the electrodes 10a and 10b, the electrical conductor in the electrode may be any appropriate conducting materials, including graphite and other suitable metals, such as carbon, platinum, and gold, for example.

The counter electrodes 15a and 15b may be any electrode suitable for forming an electrode pair with one of the electrodes 10a and 10b. For example, the counter electrodes 15a and 15b may be an appropriate metal that can interact with the seawater upon application of a conditioning signal, such that metal chloride may be formed on the surface thereof. In some embodiments, the counter electrode may include any appropriate conducting material, including graphite and metals, such as carbon, Ag, platinum, and gold, for example. Although embodiments shown in FIG. 1 show two counter electrodes 15a and 15b, it is to be understood that the number of such counter electrodes 15a and 15b is not a limitation on the scope of the invention. Other configurations may include more or fewer counter electrodes 15a and 15b. For example, the electrode conditioning system 5 may include only one counter electrode 15a or 15b, in some embodiments.

In accordance with present embodiments, the switch 20 may be used to selectively couple the electrodes 10a and 10b to the controllable current/voltage source 25 or the electronics 40. The electrodes 10a and 10b may be coupled to the electronics 40, such as an amplifier and telemetry system, when used to measure and record signals, for example. As illustrated, the switch 20 also enables selective coupling of one or more of the electrodes 10a and 10b to one or more of the counter electrodes 15a and 15b, for example, when desired to condition the electrodes 10a and 10b to restore performance or create an AgCl layer on the surface thereof. In some embodiments, the switch 20 may couple the controllable current/voltage source 25 to both of the electrodes 10a and 10b. It should be understood, however, that when coupled to the electrodes 10a and 10b, formation of material (e.g., AgCl) at the surface of one of the electrodes 10a or 10b would necessarily result in removal of material at the other one of the electrodes 10a or 10b. Accordingly, the counter electrodes 15a and 15b may be coupled to one of the electrodes 10a and 10b so that conditioning of one of the electrodes 10a and 10b can occur without hampering the performance of the other one of the electrodes 10a and 10b. For example, the switch 20 may be used to couple one of the electrodes 10a and 10b in a pair with one of the counter electrodes 15a and 15b (e.g., electrode pair 10a and 15a, electrode pair 10a and 15b, electrode pair 10b and 15a, or electrode pair 10b and 15b). In some embodiments, the switch 20 may be used to couple each of the counter electrodes 15a and 15b to a corresponding one of the electrodes 10a and 10b, forming two electrode pairs (e.g. electrode pair 10a and 15a/electrode pair 10b and 15b or electrode pair 10a and 15b/electrode pair 10b and 15a). In this manner, each of the electrodes 10a and 10b can be individually reconditioned to optimize performance.

The controllable current/voltage source 25 may be configured to generate conditioning signals in accordance with embodiments of the present invention. As used herein, the term "conditioning signal" refers to an electrical signal, such as an alternating current or direct current signal, that facilitates an electrochemical reaction at electrodes (e.g., electrodes 10a and 10b or counter electrodes 15a and 15b) to which the controllable current/voltage source 25 is coupled. The conditioning signal may be designed with a particular current, voltage, signal shape, and/or content to facilitate the desired electrochemical reaction at the electrodes 10a and 10b, for example. Examples of suitable devices that can be used as the controllable current/voltage source 25 include a wide variety of devices capable of generating the desired conditioning signals, including batteries, simple power units for generating electric energy, and signal generators, among others. It should be understood that the design and strength of the conditioning signal may vary dependent upon a number of factors, including desired conditioning (e.g., light reconditioning, heavy biofouling cleaning, total electrode surface regeneration, etc.) and electrode connection scheme. For example, the conditioning signal may be a high-frequency, switching signal in which a layer of material (e.g., AgCl) may be formed on the surface of each of the electrodes 10a and 10b when a minor cleaning is desired. In some embodiments, the conditioning signal may be a direct current signal with a constant current. For example, a constant current may be applied to each of the electrodes 10a and 10b of less than about 1 amp, less than about 500 milliamps, or less than about 200 milliamps with a supply voltage of about 0.5 volts to about 5 volts and, alternatively about 2 volts to about 5 volts. In one embodiment, a constant current of about 100 milliamps may be applied to each of the electrodes 10a and 10b. In some embodiments, the conditioning signal may have a varying voltage, for example, the conditioning signal may start with a constant high voltage (e.g., about 5 volts to about 10 volts) to induce formation of material on the electrode surface followed by a constant low voltage (e.g., about 2 volts to about 5 volts) once formation has started.

One embodiment for using the conditioning system 5 for reconditioning electrodes 10a and 10b will now be described. In accordance with present embodiments, the electrodes 10a and 10*b* may be deployed in the sea with a marine electromagnetic survey system. While deployed, the electrodes 10*a* and 10*b* may be used, for example, to sense a parameter (e.g., voltages) than can be used to infer certain properties of subsurface rock, such as structure, mineral composition. During this sensing step, the switch 20 may selectively couple the electrodes 10*a* and 10*b* to electronics 45, such as an amplifier, for example. As previously mentioned, the electrode performance may deteriorate during use due to a number of factors, including the accumulations of undesirable deposits on the electrode surface, among others. In some embodiments, electrode performance may deteriorate such that the noise generated by the electrodes 10*a* and 10*b* may be greater than amplifier noise, for example. At a desired time, a conditioning step may be performed to optimize performance of the electrodes 10*a* and 10*b*. In some embodiments, the conditioning step may be performed when the noise level from the electrodes 10*a* and 10*b* may in the range of from about −130 db rel 1V/sqrt (Hz) to about −170 db rel 1V/sqrt (Hz). For example, the conditioning step may be performed when the noise level from the electrodes 10*a* and 10*b* is equal to or exceeds about −130 db rel 1V/sqrt (Hz). In some embodiments, the electrodes 10*a* and 10*b* may be conditioned such that the noise level after conditioning is less than about −130 db rel 1V/sqrt (Hz). For the conditioning step, the switch may selectively couple the controllable current/voltage source 25 to a first electrode pair comprising one of the electrodes 10*a* and 10*b* and one of the counter electrodes 15*a* and 15*b* and to a second electrode pair comprising the other one of the electrodes 10*a* and 10*b* and the other one of the counter electrodes 15*a* and 15*b*. As discussed above, other electrode connection schemes may also be employed in accordance with embodiments of the present invention. With the controllable current/voltage source 25 coupled to the first and second electrode pairs, the conditioning step further may including sending a conditioning signal to each electrode pair, the conditioning signal being configured to remove material (e.g., AgCl) on the surfaces of the electrodes 10*a* and 10*b*, in some embodiments. In alternative embodiments, the conditioning signal may be configured to form material (e.g., AgCl) on the surfaces of the electrodes 10*a* and 10*b*. In alternative embodiments, a first conditioning signal may be sent to each of the electrode pairs configured to remove material on the surfaces of the electrodes 10*a* and 10*b*, followed by a second conditioning signal configured to form material on the surfaces of the electrodes 10*a* and 10*b*. After the cleaning step, the switch 20 may selectively couple the electrodes 10*a* and 10*b* to electronics 45, and an additional sensing step may be performed, in accordance with certain embodiments. Performance of the electrodes 10*a* and 10*b* can be optimized, for example, by alternating cleaning steps with sensing steps during deployment of the marine electromagnetic survey system.

Figure 2:
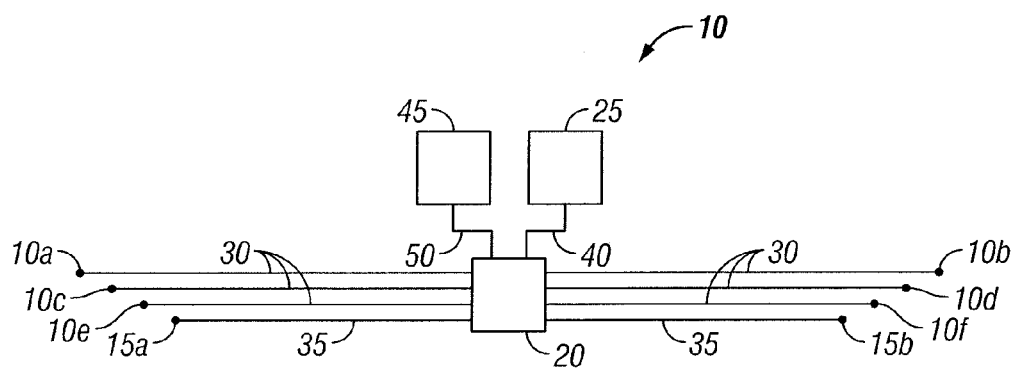
FIG. 2 is a schematic view of an electrode conditioning system in accordance with alternative embodiments of the present invention.

FIG. 2 illustrates of an electrode conditioning system 5 in accordance with alternative embodiments of the present invention. In the illustrated embodiment, the electrode condition system 5 includes more than two electrodes 10*a*-10*f* rather than a single pair of electrodes 10*a* and 10*b*, as illustrated by FIG. 1. It should be noted that while six different electrodes 10*a*-10*f* are shown on FIG. 2 and a single pair of electrodes 10*a* and 10*b* are shown on FIG. 1, the number of such electrodes 10 is not a limitation on the scope of the invention. Other configuration may include any number of electrodes 10 that may be suitable for a particular application. In the embodiment illustrated by FIG. 2, the switch 20 may be used to selectively couple the electrodes 10*a*-10*f* to the controllable current/voltage source 25 or the electronics 45. As illustrated, the switch 20 also enables selective coupling of one or more of the electrodes 10*a*-10*f* to one or more of the counter electrodes 15*a* and 15*b*, for example, when desired to condition the electrodes 10*a*-10*f* to restore performance. While only as single switch 20 is illustrated, it should be understood that more than one switch 20 may be used in accordance with embodiments of the present invention.

As previously mentioned, embodiments of the present invention may be used for conditioning of electrodes 10 (e.g., electrodes 10*a* and 10*b* on FIG. 1 or electrodes 10*a*-10*f* on FIG. 2) while deployed in the sea with a marine electromagnetic survey system. For example, embodiments may be used to condition electrodes 10 that are installed on a towed survey cable. In alternative embodiments, the electrodes 10 may be at a fixed location with respect to an energy source, which may include, for example, attachment of the electrodes 10 on one or more cables positioned on the water bottom or attachment of the electrodes 10 to one or more subsurface acquisition nodes.

Figure 3:
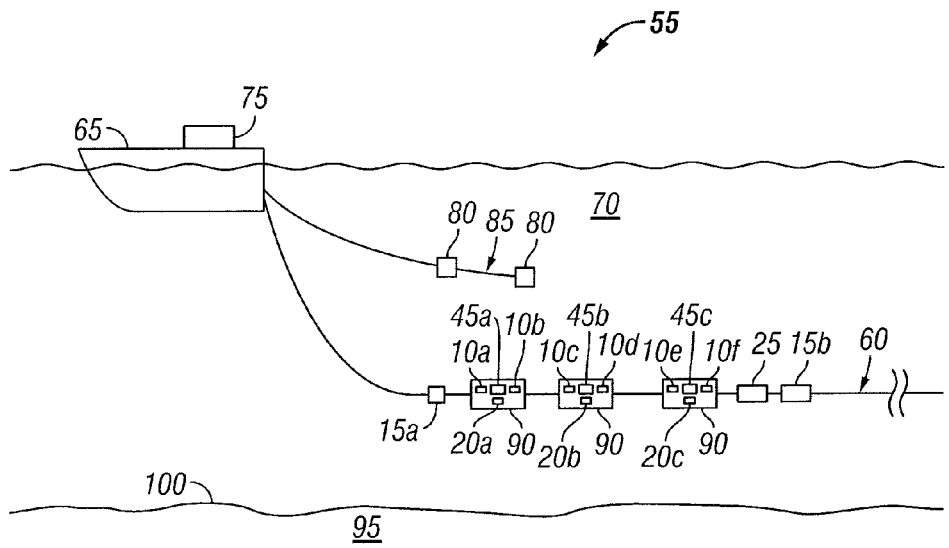
FIG. 3 is a schematic view of an electromagnetic survey system comprising towed survey cables on which an electrode conditioning system is installed in accordance with embodiments of the present invention.

FIG. 3 illustrates a marine electromagnetic survey system 55 that includes electrodes 10*a*-10*f* installed on a survey cable 60 in accordance with embodiments of the present invention. In the illustrated embodiment, the marine electromagnetic survey system 55 includes a survey vessel 65 moving along the surface of a body of water 70, such as a lake or sea. The survey vessel 65 generally may include equipment, shown generally at 75 and collectively referred to herein as a "recording system." The recording system 75 may include devices (none shown separately) for determining geodetic position of the vessel 65 (e.g., a global positioning system satellite receiver signal), detecting and making a time indexed record of signals generated by each of electromagnetic sensors 90, and actuating one or more energy sources 80 (explained further below) at selected times. As illustrated, the survey vessel 65 may tow the source cable 85 and the survey cable 60, wherein energy sources 80 are disposed on source cable 85. Although only two energy sources 80 and a single survey cable 60 are shown, this is for illustrative purposes only. It should be understood that the marine electromagnetic survey system 55 may include more or less energy sources 80 and survey cables 60. For example, in some embodiments, eight or more laterally spaced apart survey cables 60 may be towed by the survey vessel 65, while in other embodiments, up to 26 laterally spaced apart survey cables 60 may be towed by the survey vessel 65. The energy sources 80 may be any selectively actuable sources suitable for subsurface electromagnetic surveying, such as one or more electromagnetic field transmitters. Without limitation, the energy sources 80 may generate current that diffuses through the water 70 and into rock formations 95 beneath the water bottom 100, thereby creating an electric field. As illustrated, the energy sources 80 may be towed through the water 70 at different depths with respect to one another.

As illustrated, the electromagnetic sensors 90 may be disposed on the survey cable 60 at spaced apart locations. The electromagnetic sensors 90 may include, without limitation, any of a variety of electromagnetic field sensors, such as electrodes, magnetic field sensors, or magnetometers. The electromagnetic sensors 90 may generate response signals, such as electrical or optical signals, in response to detecting changes in the electric field generated by the energy sources 80 due to interaction of the electric field with the rock formations 95. While not illustrated, additional equipment may be coupled to the survey cable 60, including, for example, position control devices and sensors of various types, such as depth sensors. In the illustrated embodiment, the electromagnetic sensors 90 include electrodes 10*a*-10*f*, switches 20*a*-20*c*, and electronics 45*a*-45*c*.

The survey cable 60 further may include counter electrodes 15a and 15b and controllable current/voltage source 25. The positioning of the counter electrodes 15a and 15b on the survey cable 60 is for illustrative purposes only, and the present invention is not limited to inclusion of the counter electrodes 15a and 15b on the same section of the survey cable 60 as the electrodes 10a-10f. By way of example, for one survey cable 60 as seen in FIG. 3 two or more counter electrodes 15 and 15b may be used with connections through the survey cable 60 to the electrodes 10a-10f. As described above, one or more of the electrodes 10a-10f may be selectively coupled to the controllable current/voltage source 25 and/or one or more of the counter electrodes 15a and 15b, for example, when desired to condition the electrodes 10a-10f to restore performance. By way of example, the switch 20a may be used to selectively couple electrode 10a with the controllable current/voltage source 25 and the counter electrode 15a for a cleaning step, which may include removal and/or formation of material on the surface of one or more of the electrodes 10a-10f.

Figure 4:
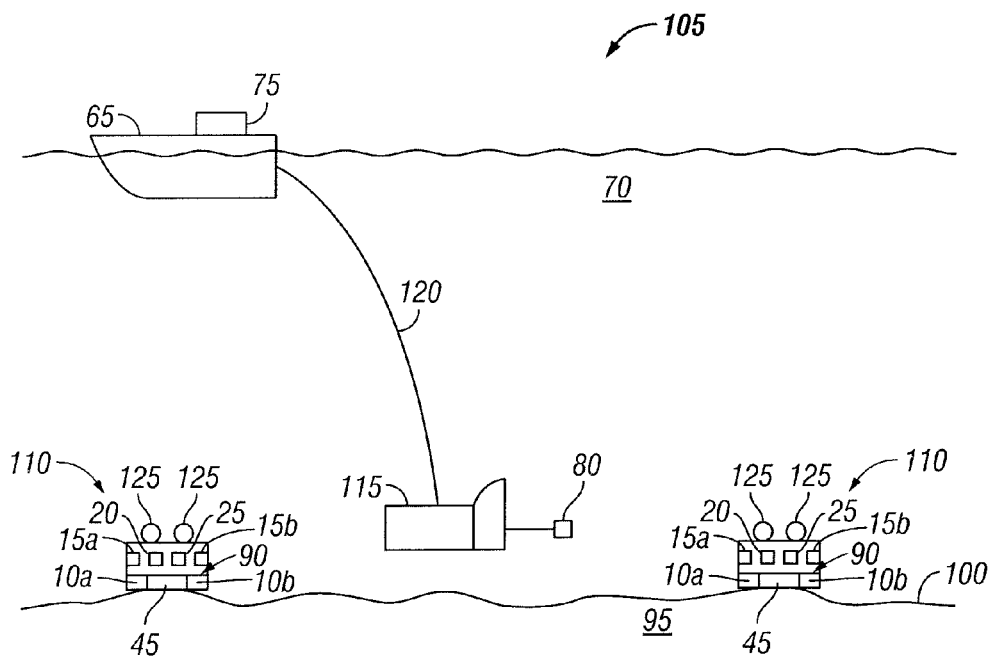
FIG. 4 is a schematic view of an electromagnetic survey system comprising subsurface acquisition nodes on which electrode conditioning systems have been installed in accordance with embodiments of the present invention.

FIG. 4 illustrates a second marine electromagnetic survey system 105 that includes electrodes 10a and 10b installed on subsurface acquisition nodes 110, in accordance with embodiments of the present invention. In the illustrated embodiment, the second marine electromagnetic survey system 105 includes a survey vessel 65 that moves along the surface of the body of water 70. The survey vessel 65 generally may include a recording system 75. A submersible vehicle 115 carrying an energy source 80 may be attached to the survey vessel 65 by cable 120. One or more subsurface acquisition nodes 110 may be located on the water bottom 100. Although the embodiment shown in FIG. 4 shows two subsurface acquisition nodes 110 and one energy source 80, it is to be understood that the number of such subsurface acquisition nodes 110 and energy source 80 is not a limitation on the scope of the invention. Other configurations may include more or fewer subsurface acquisition nodes 110 and energy sources 80. Each of the subsurface acquisition nodes 110 may include a flotation device 125, a ballast weight (not illustrated,) and electromagnetic sensors 90. The electromagnetic sensors 90 may generate response signals, such as electrical or optical signals, in response to detecting energy emitted from the energy source 80 after the energy has interacted with rock formations 95 below the water bottom 100. As illustrated, the electromagnetic sensors 90 may include electrodes 10a and 10b and electronics 45. Each of the subsurface acquisition nodes further may include counter electrodes 15a and 15b, switch 20, and controllable current/voltage source 25. As described above, for each of the subsurface acquisition nodes 110, one or more of the electrodes 10a and 10b may be selectively coupled to the controllable current/voltage source 25 and/or one or more of the counter electrodes 15a and 15b, for example, when desired to condition the electrodes 10a and 10b to restore performance. By way of example, the switch 20 may be used to selectively couple the electrode 10a with the controllable current/voltage source 25 and the counter electrode 15a for a cleaning step, which may include removal and/or formation of material on the surface of one or more of the electrodes 10a-10f.

Figure 5:
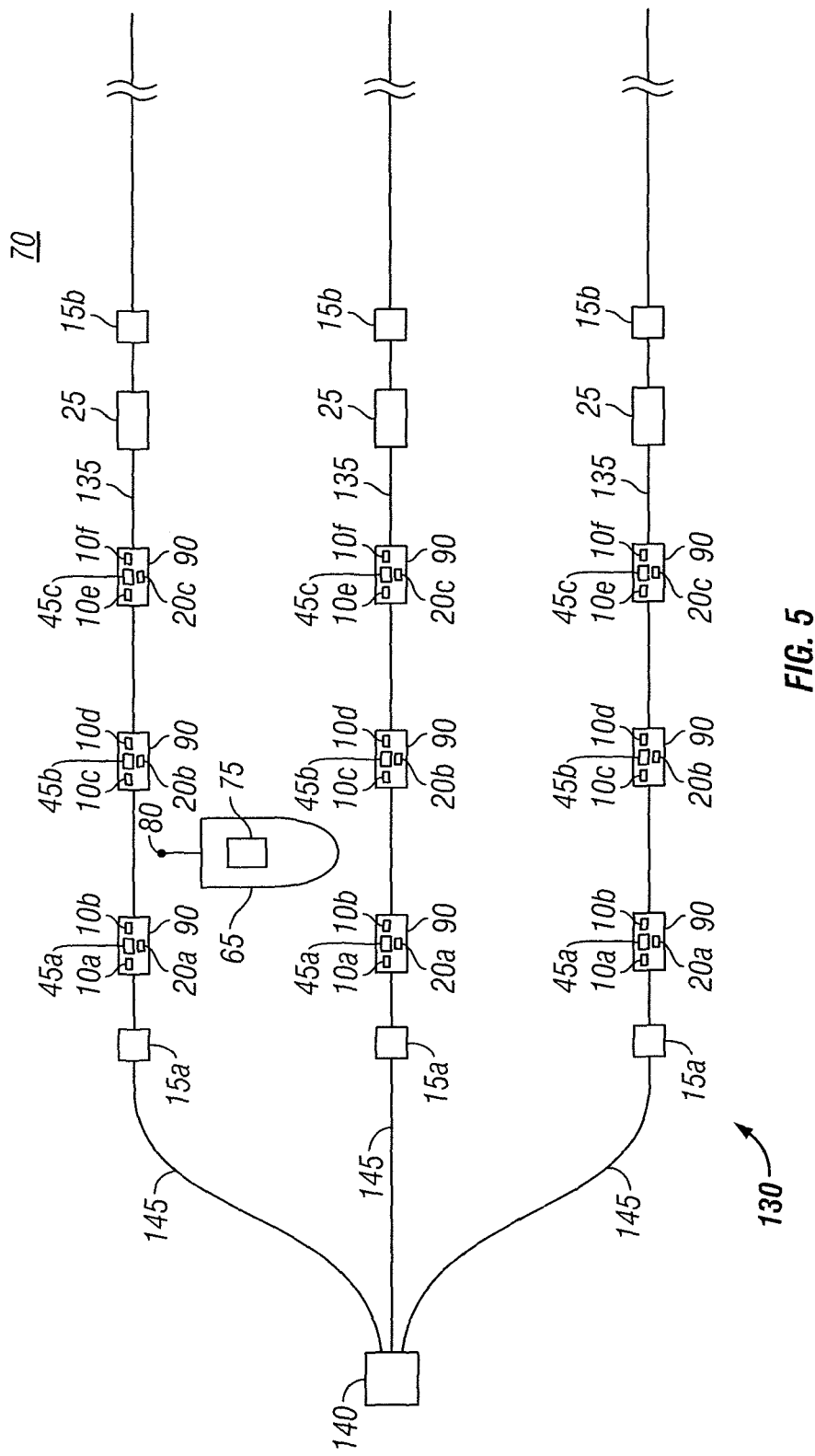
FIG. 5 is a schematic view of an electromagnetic survey system comprising ocean bottom cables on which electrode conditioning systems have been installed in accordance with embodiments of the present invention.

FIG. 5 illustrates a third marine electromagnetic survey system 130 that includes electrodes 10a-10f installed on one or more cables 135 positioned on the water bottom (not illustrated), in accordance with embodiments of the present invention. In the illustrated embodiment, the third marine electromagnetic survey system 130 includes a survey vessel 65 that moves along the surface of the body of water 70. The survey vessel 65 generally may include a recording system 75 and tow one or more energy sources 80. As illustrated, electromagnetic sensors 90 may be disposed at the water bottom (not illustrated) on one or more cables 135. In the illustrated embodiment, the electromagnetic sensors 90 include electrodes 10a-10f, switches 20a-20c, and electronics 45a-45c. The electromagnetic sensors 90 may generate response signals, such as electrical or optical signals, in response to detecting energy emitted from the energy source 80 after the energy has interacted with rock formations (not illustrated) below the water bottom. The signals gathered by the electromagnetic sensors 90 may be communicated along the cables 135 to recording buoy 140, which can be, for example, electrically coupled to the electromagnetic sensors 90 by lead-in lines 145. Although the embodiment shown in FIG. 5 shows three cables 135 each with a respective lead-in line 145 all of which are coupled to the buoy 140, it is to be understood that the number of such cables 135, lead-in lines 145, and buoy 140 is not a limitation on the scope of the invention. Other configurations may include more or fewer cables 135, lead-in lines 145, and buoys 140. Each of the cables 135 further may include counter electrodes 15a and 15b, and controllable current/voltage source 25. As described above, one or more of the electrodes 10a-10f may be selectively coupled to the controllable current/voltage source 25 and/or one or more of the counter electrodes 15a and 15b, for example, when desired to condition the electrodes 10a-10f to restore performance. By way of example, the switch 20a may be used to selectively couple electrode 10a with the controllable current/voltage source 25 and the counter electrode 15a for a cleaning step, which may include removal and/or formation of material on the surface of one or more of the electrodes 10a-10f.

While the preceding description describe the use of the counter electrodes 15a and 15b for use in conditioning of electrodes 10a-10f, the counter electrodes 15a and 15 may also be used to generate an electric field in the body of water 70. This electric field may then be detected with one or more of the electrodes 10a-10f. Without limitation, this detected electric field may be used for purposes of calibration and resistance measurement.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. A method, comprising:
deploying electromagnetic sensor electrodes in seawater during a marine electromagnetic survey;
coupling at least one of the electromagnetic sensor electrodes to a controllable current or voltage source while the electromagnetic sensor electrodes are deployed in the seawater, wherein the coupling at least one of the electromagnetic sensor electrodes to a controllable current or voltage source comprises: coupling at least of the electromagnetic sensor electrodes to a controllable current or voltage source and a first counter electrode, wherein the first counter electrode is not one of the electromagnetic sensor electrodes; and coupling another one of the electromagnetic sensor electrodes to the controllable current or voltage source and a second counter electrode, wherein the second counter electrode is not one of the electromagnetic sensors electrodes, while the electromagnetic sensor electrodes are deployed, and sending a second conditioning signal from controllable current or voltage source to the one of the electromagnetic sensor electrodes coupled to the second counter electrode; and
sending a first conditioning signal from the controllable current or voltage source to the at least one of the electromagnetic sensor electrodes coupled to the controllable current or voltage source, wherein the first conditioning signal is sent from the controllable current or voltage source to the at least one of the electromagnetic sensor electrodes through one or more lines, wherein the one or more lines are coupled to the electromagnetic sensor electrodes and to the controllable current or voltage source.

2. The method of claim 1, wherein the electromagnetic sensor electrodes comprise Ag/AgCl-based electrodes.

3. The method of claim 1, wherein the electromagnetic sensor electrodes comprise Ag/AgCl-based electrodes and the step of sending a first conditioning signal results in creation of one or more metal chloride layers on the surface of the at least one of the electromagnetic sensor electrodes coupled to the controllable current or voltage source.

4. The method of claim 1, further comprising: emitting an electric field into the seawater using the first and second counter electrodes, and detecting the electric field with the electromagnetic sensor electrodes.

5. The method of claim 1, wherein the sending the first conditioning signal from the controllable current or voltage source results in formation of metal chloride on a surface of the at least one of the electromagnetic sensor electrodes coupled to the controllable current/voltage source.

6. The method of claim 1, wherein the sending the first conditioning signal from the controllable current or voltage source results in removal of material from a surface the at least one of the electromagnetic sensor electrodes coupled to the controllable current/voltage source.

7. The method of claim 6, further comprising sending a second conditioning signal from the controllable current/voltage source to the at least one of the electromagnetic sensor electrodes coupled to the controllable current or voltage source to form metal chloride on the surface of the electrode after the removal of the material from the surface of the electromagnetic sensor electrode.

8. The method of claim 1, further comprising coupling the electromagnetic sensor electrodes to electronics, after the sending the first conditioning signal, and then sensing changes in an energy field using the electromagnetic sensor electrodes, wherein the energy field was emitted from an energy source and then interacted with one or more rock formations below a water bottom.

9. The method of claim 1, wherein the at least one of the electromagnetic sensor electrodes coupled to the controllable current/voltage source has a noise level that exceeds about −130 dB rel 1V/sqrt (Hz) prior to the step of sending the first conditioning signal.

10. The method of claim 1, further comprising towing a survey cable on which the electromagnetic sensor electrodes are disposed.

11. The method of claim 1, wherein the electromagnetic sensor electrodes are attached to a cable disposed on a water bottom.

12. The method of claim 1, wherein the electromagnetic sensor electrodes are attached to a subsurface acquisition node.

13. A method, comprising:
towing a survey cable in a body of seawater, wherein the survey cable comprises electromagnetic sensors disposed at spaced apart locations on the survey cable, counter electrodes disposed on the survey cable, and a controllable current or voltage source disposed on the survey cable, and wherein each of the electromagnetic sensors comprises Ag/AgCl-based electrodes;
emitting energy from an energy source such that the energy interacts with one or more rock formations below a bottom of the body of seawater;
detecting an energy change in the electromagnetic sensors after the energy has interacted with the one or more rock formations;
coupling at least one of the Ag/AgCl-based electrodes to the controllable current/voltage source and at least one of the counter electrodes while towing the survey cable; and
sending a first conditioning signal from the controllable current/voltage source to condition the at least one of the Ag/AgCl-based electrodes coupled to the controllable current/voltage source, wherein the first conditioning signal is sent from the controllable current/voltage source to the at least one of the Ag/AgCl-based electrodes through one or more lines.

14. The method of claim 13, wherein the first conditioning signal results in formation of AgCl on the surface of the at least one of the Ag/AgCl-based electrodes coupled to the controllable current or voltage source.

15. The method of claim 13, wherein the first conditioning signal results in removal of material from the surface of the at least one of the Ag/AgCl-based electrodes coupled to the controllable current/voltage source.

16. The method of claim 13, wherein the first conditioning signal is an alternating current signal or a direct current signal.

17. The method of claim 13, wherein the first conditioning signal comprises a direct current signal at a constant current of less than about 1 amp and a supply voltage of about 0.5 volts to about 5 volts.

18. The method of claim 1, wherein the first conditioning signal is an alternating current signal or a direct current signal.

19. The method of claim 1, wherein the first conditioning signal comprises a direct current signal at a constant current of less than about 1 amp and a supply voltage of about 0.5 volts to about 5 volts.

20. A method, comprising:
sensing one or more parameters with a pair of electromagnetic sensor electrodes while deployed in a body of water, wherein the pair of electromagnetic sensor electrodes are selectively coupled to sensor electronics and a controllable current or voltage source by way of a switch;

forming a first electrode pair by coupling the controllable current/voltage source to one of the electromagnetic sensor electrodes and a counter electrode; and sending a direct current or alternating current signal to the first electrode pair through one or more lines that couple the controllable current or voltage source to the first electrode pair to remove material from surfaces of the one of the electromagnetic sensor electrodes in the first electrode pair.

21. The method of claim 20, wherein the first conditioning signal comprises a direct current signal at a constant current of less than about 1 amp and a supply voltage of about 0.5 volts to about 5 volts.

22. The method of claim 19, wherein a switch is used to selectively couple a pair of electrodes to the controllable current or voltage source when conditioning the pair of electrodes and to electronics when measuring and recording signals.

* * * * *